(12) United States Patent
Dharmaraj

(10) Patent No.: US 10,099,805 B2
(45) Date of Patent: Oct. 16, 2018

(54) ARTIFICIAL GRAVITY SYSTEM WITH ROTATING HUB THAT IS SEALED WITH ROTARY SEALS

(71) Applicant: The Boeing Company, Chicago, IL (US)

(72) Inventor: Raju Dharmaraj, League City, TX (US)

(73) Assignee: The Boeing Company, Chicago, IL (US)

( * ) Notice: Subject to any disclaimer, the term of this patent is extended or adjusted under 35 U.S.C. 154(b) by 351 days.

(21) Appl. No.: 15/052,383

(22) Filed: Feb. 24, 2016

(65) Prior Publication Data

US 2017/0240302 A1 Aug. 24, 2017

(51) Int. Cl.
*B64G 1/60* (2006.01)
*B64G 1/12* (2006.01)

(52) U.S. Cl.
CPC .............. *B64G 1/60* (2013.01); *B64G 1/12* (2013.01)

(58) Field of Classification Search
CPC .. F16D 67/02; B64G 1/12; B64G 1/46; B64G 1/60
See application file for complete search history.

(56) References Cited

U.S. PATENT DOCUMENTS

| | | | | |
|---|---|---|---|---|
| 3,744,739 A * | 7/1973 | Weaver | ..................... | B64G 1/12 244/172.4 |
| 4,643,375 A * | 2/1987 | Allen | ..................... | B64G 1/60 244/171.9 |
| 5,791,600 A * | 8/1998 | Thompson | ..................... | B64G 1/12 244/120 |
| 6,206,328 B1 * | 3/2001 | Taylor | ..................... | B64G 1/12 244/159.6 |
| 6,216,984 B1 * | 4/2001 | Brinsmade | ..................... | B64G 1/12 244/159.4 |
| 6,523,782 B2 * | 2/2003 | Barutt | ..................... | B64G 1/12 244/171.9 |
| 9,090,361 B2 * | 7/2015 | Clay | ..................... | B64G 1/14 |
| 9,359,091 B2 * | 6/2016 | Biddlecom | ..................... | B64G 1/46 |
| 9,776,743 B2 * | 10/2017 | Dharmaraj | ..................... | B64G 1/46 |
| 2014/0068858 A1 * | 3/2014 | Wambeke | ..................... | A47G 9/062 5/420 |
| 2014/0124627 A1 * | 5/2014 | Clay | ..................... | B64G 1/14 244/159.3 |
| 2017/0197734 A1 * | 7/2017 | Dharmaraj | ..................... | B64G 1/12 |

(Continued)

*Primary Examiner* — Philip J Bonzell
*Assistant Examiner* — Michael B Kreiner
(74) *Attorney, Agent, or Firm* — Duft Bornsen & Fettig LLP

(57) ABSTRACT

A habitation module that provides an artificial gravity environment. In one embodiment, the habitation module includes a core structure having cylindrical sections spaced apart from one another, and a hub that slides over one of the cylindrical sections of the core structure to span a distance between the cylindrical sections. The hub includes a plurality of portals spaced radially around a circumference of the hub, and gravity chambers attach to portals of the hub. A drive mechanism rotates the hub about an axis in relation to the core structure to simulate a gravitational force within the gravity chambers. Rotary seals form an air-tight seal between the hub and the cylindrical sections of the core structure so that the interior of the hub and the gravity chambers may be pressurized.

32 Claims, 15 Drawing Sheets

(56) References Cited

U.S. PATENT DOCUMENTS

| | | | |
|---|---|---|---|
| 2017/0197735 A1* | 7/2017 | Dharmaraj | B64G 1/46 |
| 2017/0197736 A1* | 7/2017 | Dharmaraj | B64G 1/60 |
| 2017/0197738 A1* | 7/2017 | Dharmaraj | B64G 1/60 |
| 2017/0240302 A1* | 8/2017 | Dharmaraj | B64G 1/60 |
| 2017/0240303 A1* | 8/2017 | Dharmaraj | B64G 1/60 |

* cited by examiner

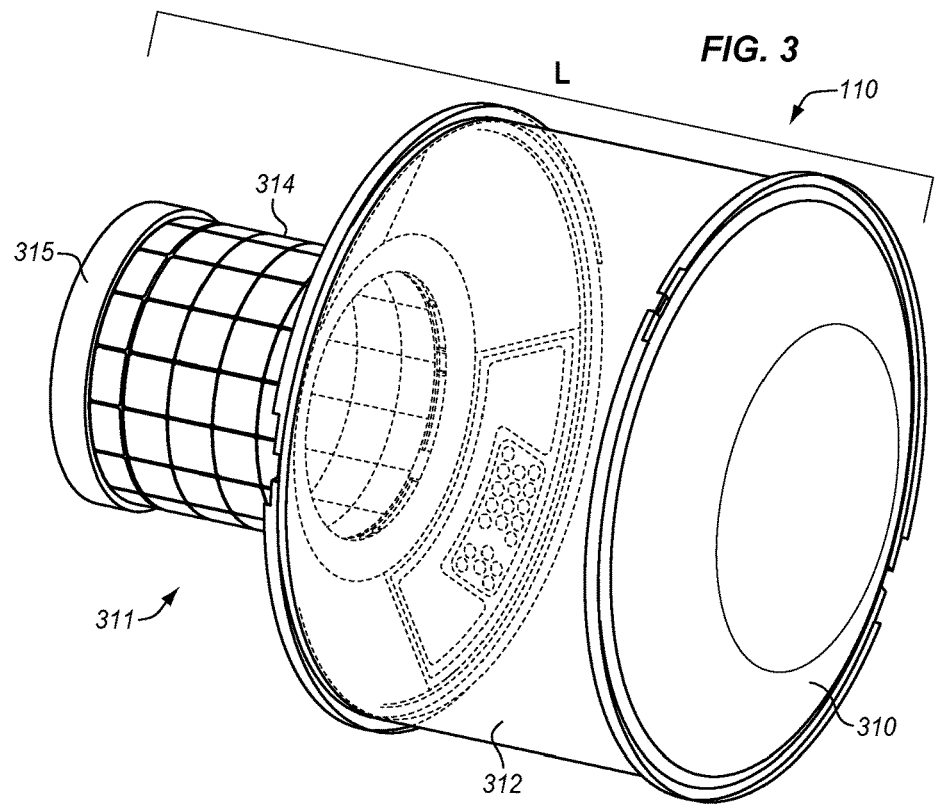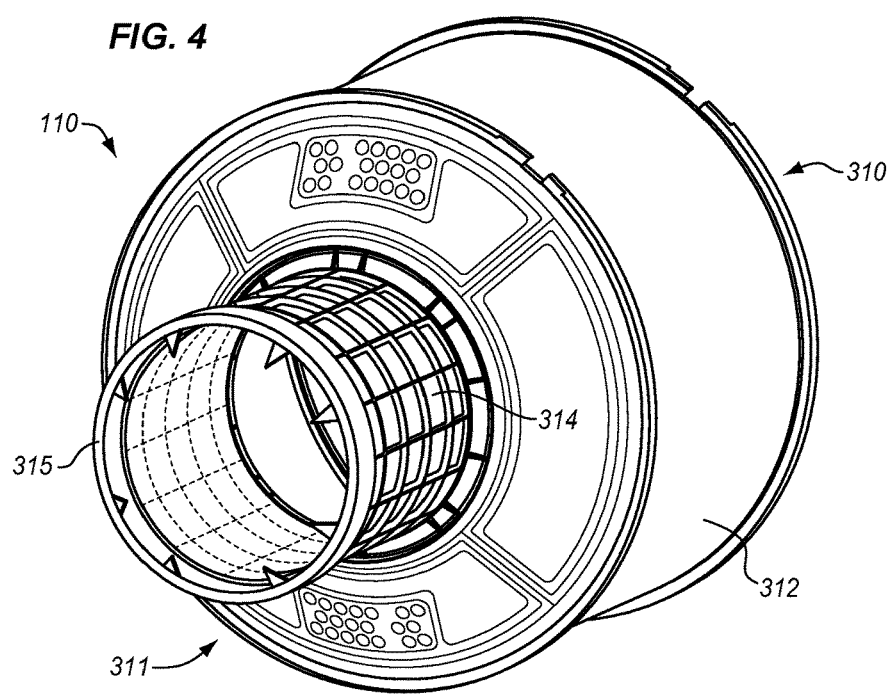

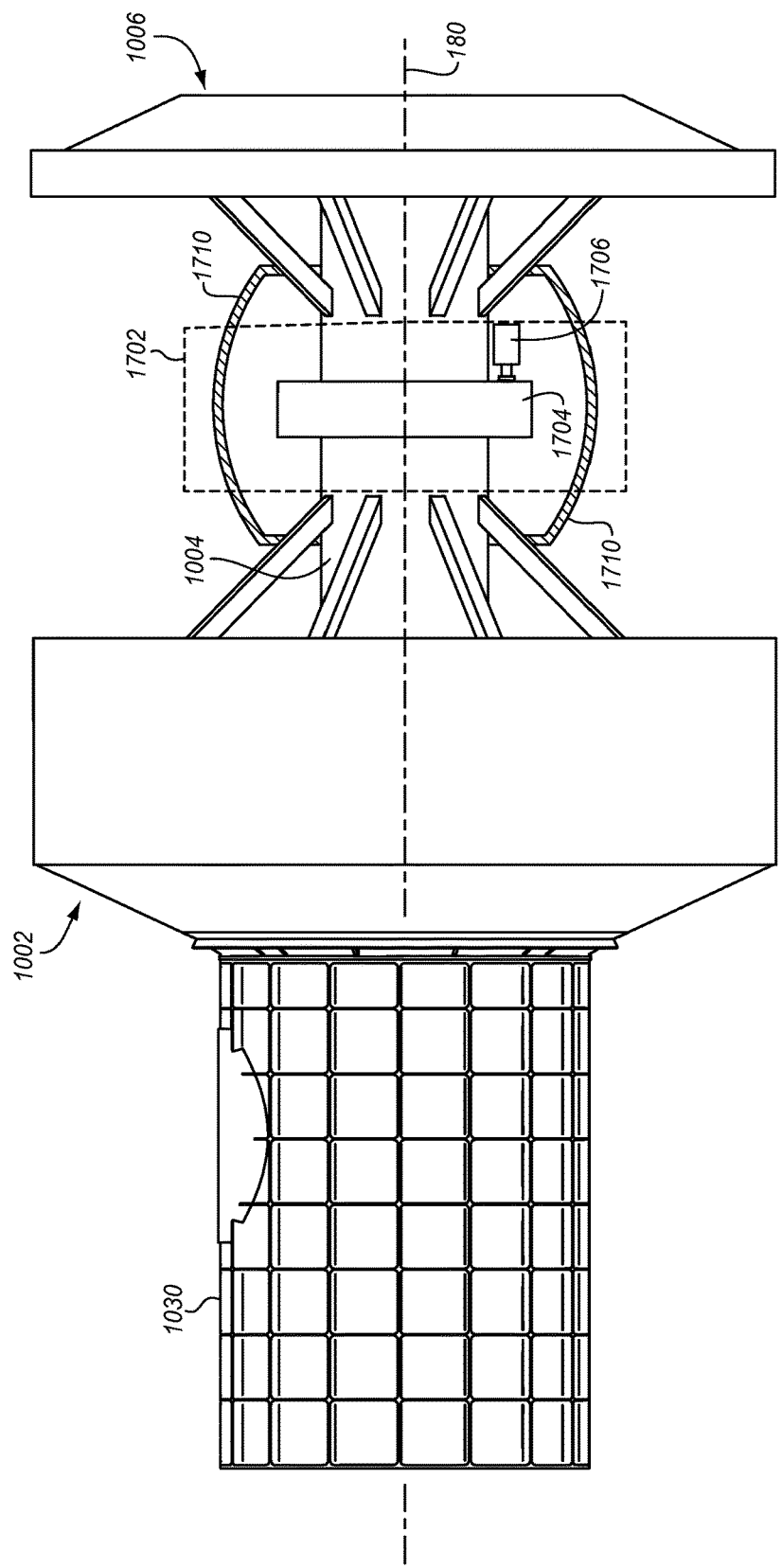

ARTIFICIAL GRAVITY SYSTEM WITH ROTATING HUB THAT IS SEALED WITH ROTARY SEALS

FIELD

This disclosure relates to the field of habitation modules that provide artificial gravity environments.

BACKGROUND

When humans occupy a space station, they encounter a zero-gravity environment or "weightless" environment. Extended exposure to a zero-gravity environment can be detrimental to the health of the human occupants, such as muscle and bone degeneration. To avoid these long-term health effects, artificial gravity environments may be installed in the space station. One way to create artificial gravity is with centrifugal force, where a vessel rotates at a speed that drives a human occupant inside of the vessel toward the outer hull of the vessel. The force on the human occupant feels like a gravitational pull.

Because of the health benefits and comfort of artificial gravity, it is desirable to design improved artificial gravity environments for space habitats/vehicles.

SUMMARY

Embodiments described herein include a habitation module for a space station or the like that includes one or more pairs of gravity chambers. The habitation module includes a stationary structure and a rotating structure that is slid upon the stationary structure. The rotating structure includes a cylindrical hub and one or more pairs of gravity chambers that extend radially from the hub in opposite directions. The hub is driven to rotate about an axis in relation to the stationary structure to create artificial gravity within each of the gravity chambers. As an artificial gravity environment is created in the gravity chambers, crew members may enter the gravity chambers for exercise, rest, lounging, or other activities.

It may be beneficial to have the interior portions of the hub and the gravity chambers pressurized so that crew members don't need to wear pressurized suits when in the gravity chambers. To create a pressurized environment, rotary seals are installed at the connection points between the hub and the stationary structure of the habitation module. The rotary seals provide an air-tight juncture between the rotating hub and the stationary structure of the habitation module. Therefore, even though the hub is rotating to provide an artificial gravity environment within the gravity chambers, the interior of the hub and the gravity chambers may be pressurized.

One embodiment comprises a habitation module having a core structure that includes a first cylindrical section, a second cylindrical section spaced apart from the first cylindrical section and aligned axially, and a support beam that attaches the first cylindrical section and the second cylindrical section. The habitation module further includes a hub comprising a hollow cylinder that slides onto the core structure over free space between the first cylindrical section and the second cylindrical section, and connects to the first cylindrical section and the second cylindrical section through rotatable attachment members. The hub includes a plurality of portals spaced radially around a circumference of the hub. The habitation module further includes a first rotary seal that spans a first gap between the hub and the first cylindrical section to form an air-tight seal around a circumference of the first cylindrical section, and a second rotary seal that spans a second gap between the hub and the second cylindrical section to form an air-tight seal around a circumference of the second cylindrical section. The habitation module further includes a plurality of gravity chambers that attach to the portals of the hub through air-tight seals. The air-tight seals provide a pressurized environment within the free space and within the gravity chambers. The habitation module further includes a drive mechanism that rotates the hub about an axis in relation to the core structure to simulate a gravitational force within the gravity chambers.

In another embodiment, the first cylindrical section comprises a pressurized compartment with a hatch for accessing the free space.

In another embodiment, the portals provide passageways between the free space and interiors of the gravity chambers.

In another embodiment, each gravity chamber includes an outer wall, an inner structure, and a cylindrical side wall that connects the outer wall and the inner structure. The inner structure of each gravity chamber includes a berthing connector for connecting a gravity chamber to a berthing connector of a portal of the hub.

In another embodiment, the berthing connectors comprise a Common Berthing Mechanism (CBM).

In another embodiment, a length of each of the gravity chambers is selected so that a distance of the outer wall to the axis of rotation is in the range of 7-8 meters.

In another embodiment, the gravity chambers extend radially from the circumference of the hub.

In another embodiment, the hub connects to the core structure with a pair of support bearings attached to opposing sides of the hub. A first one of the support bearings connects the hub to the first cylindrical section, and a second one of the support bearings connects the hub to the second cylindrical section.

In another embodiment, the first one of the support bearings includes a first outer race attached to an inner surface of the hub, a first inner race attached to an outer surface of the first cylindrical section, and a rolling element between the first inner race and the first outer race that enables rotational movement. The second one of the support bearings includes a second outer race attached to the inner surface of the hub, a second inner race attached to an outer surface of the second cylindrical section, and a rolling element between the second inner race and the second outer race that enables rotational movement.

In another embodiment, the habitation module further includes a counter-rotating member that rotates about the axis in an opposite direction than the hub.

In another embodiment, the counter-rotating member comprises a cylindrical counter-weight, and a second drive mechanism that rotates the cylindrical counter-weight about the axis in the opposite direction than the hub.

In another embodiment, the drive mechanism for the counter-rotating member adjusts a rotational speed of the cylindrical counter-weight to compensate for a change in mass within the gravity chambers.

In another embodiment, the habitation module further includes a protective cover that encloses the counter-rotating member.

In another embodiment, the habitation module further includes a ring gear affixed to the hub and having teeth that mesh with teeth on the drive mechanism.

Another embodiment comprises a habitation module comprising a stationary structure and a rotating structure that attaches to an outer circumference of the stationary structure using rotatable attachment members. The rotating structure includes a hub that comprises a hollow cylinder having a plurality of portals spaced radially around a circumference of the hub, and a plurality of gravity chambers that attach to the portals of the hub and extend radially from the hub. The habitation module further includes a drive mechanism that rotates the hub about an axis in relation to the stationary structure to simulate a gravitational force within the gravity chambers.

Another embodiment comprises a habitation module for providing an artificial gravity environment in space. The habitation module includes a core structure having coaxial cylindrical sections spaced apart from one another. The habitation module further includes a hub that comprises a hollow cylinder that slides over one of the cylindrical sections of the core structure to span a distance between the cylindrical sections. The hub includes a plurality of portals spaced radially around a circumference of the hub. The habitation module further includes one or more pairs of gravity chambers that attach to opposing portals of the hub and extend radially from the hub. The habitation module further includes rotary seals that form an air-tight seal between the hub and the cylindrical sections of the core structure. The habitation module further includes a drive mechanism that rotates the hub about an axis in relation to the core structure to simulate a gravitational force within the gravity chambers.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

FIGS. 3-4 illustrate a gravity chamber in an exemplary embodiment.

FIG. 17 illustrates a counter-rotating member in an exemplary embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
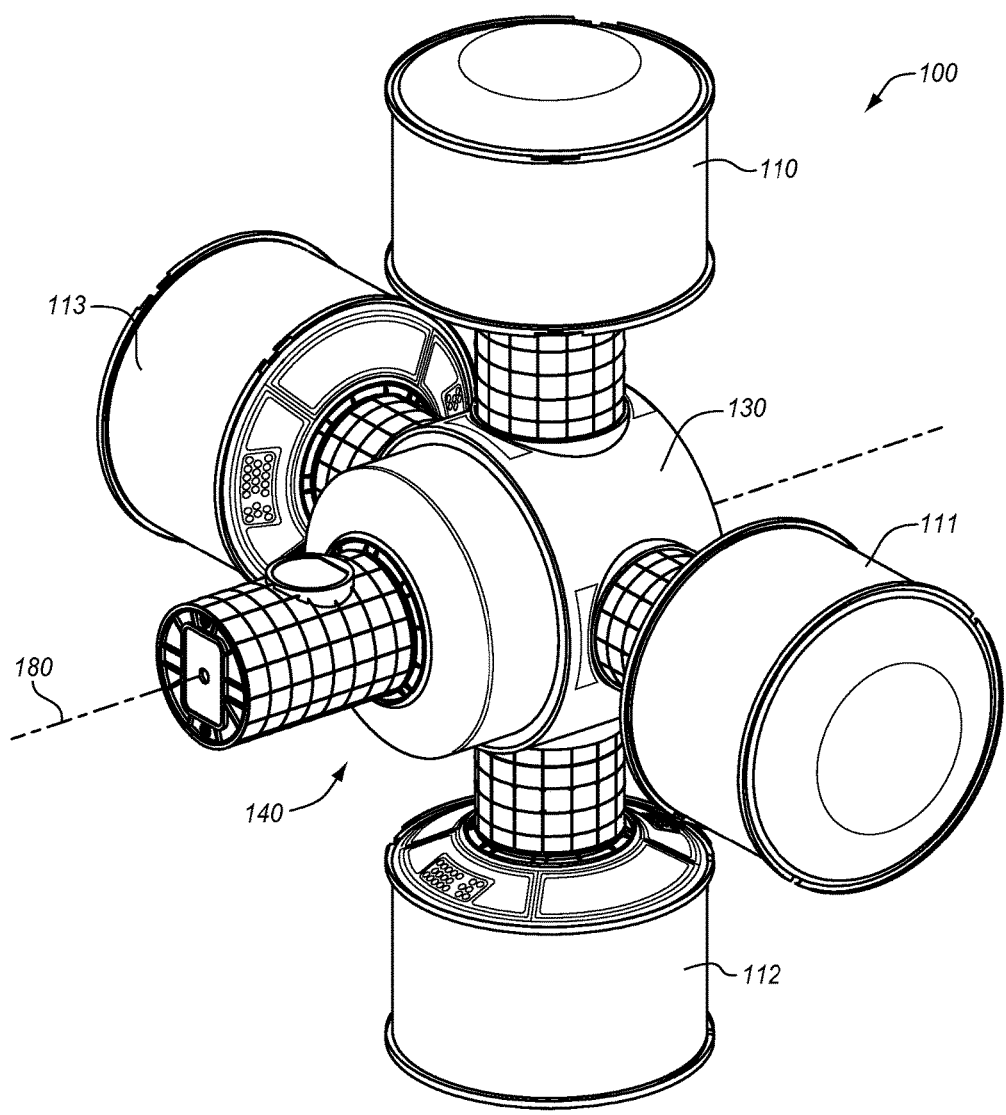
FIG. 1 illustrates a habitation module in an exemplary embodiment.

FIG. 1 illustrates a habitation module 100 in an exemplary embodiment. Habitation module (HAB) 100 is a module used for living quarters for crew members of a space station, such as the International Space Station. For example, HAB 100 may be used for sleeping quarters, restroom facilities, medical facilities, exercise facilities, etc. HAB 100 is configured for space vehicles in Low-Earth Orbit (LEO) or Beyond Low-Earth Orbit (BLEO).

HAB 100 is equipped with a plurality of gravity chambers 110-113. Gravity chambers 110-113 comprise the pods or compartments of HAB 100 where crew members may experience artificial gravity. Gravity chambers 110-113 attach to a cylindrical hub 130 that is driven to rotate about an axis 180. The combination of hub 130 and gravity chambers 110-113 represent the rotating structure of HAB 100. Hub 130 is driven to rotate at a speed about axis 180 to create an artificial gravity environment within gravity chambers 110-113. For example, hub 130 may rotate at 5 rpm, 10 rpm, 12 rpm, etc., to generate a simulated gravity, such as in the range of 0.2 G to 1 G. The speed of rotation is adjustable depending on the comfort of the crew members and the desired artificial gravity inside of gravity chambers 110-113. As will be described in more detail below, hub 130 connects to a core structure 140 of HAB 100 through attachment members, which allow hub 130 to rotate in relation to core structure 140. Core structure 140 represents the stationary structure of HAB 100. Either (or both) of the ends of core structure 140 may be attached to other modules of a space station.

Figure 2:
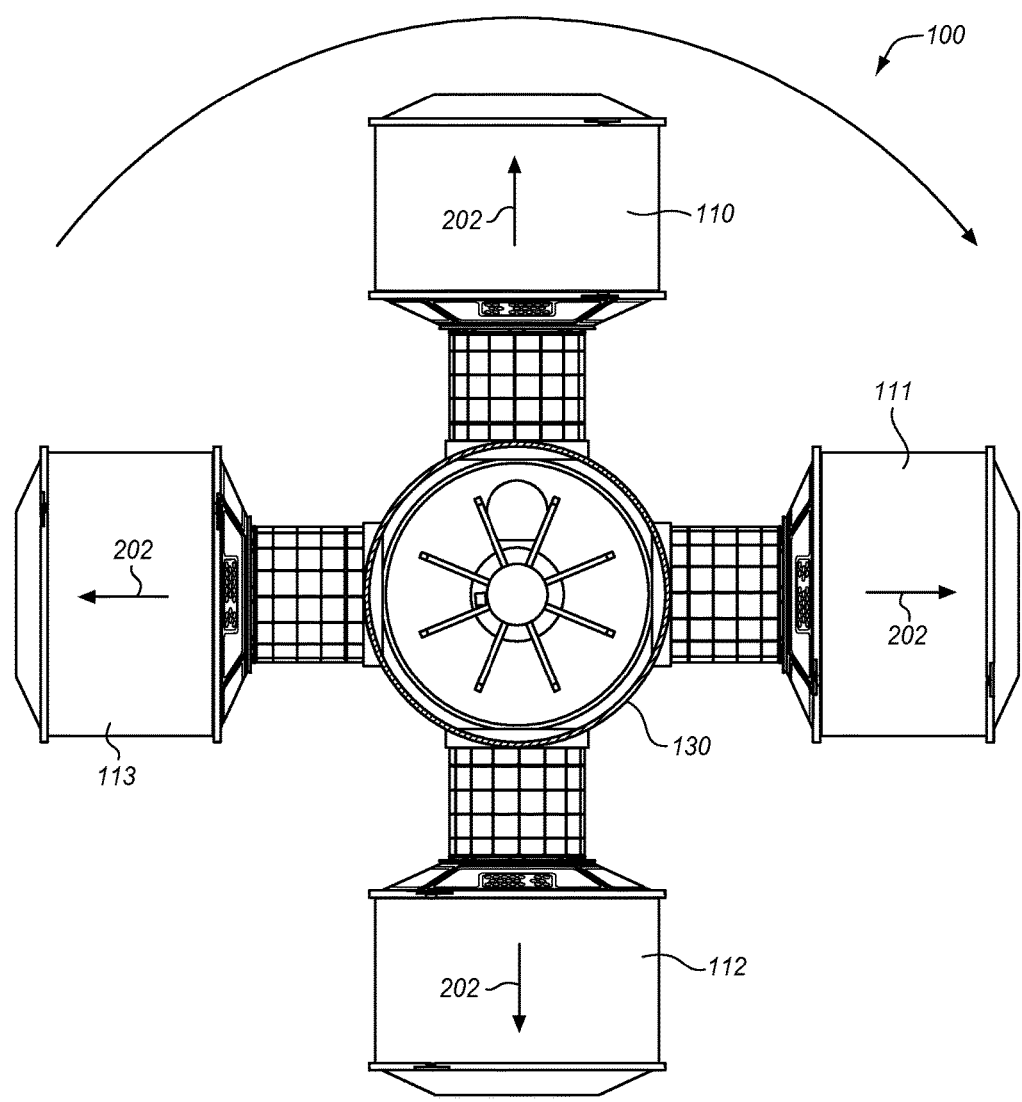
FIG. 2 is a side view of a habitation module in an exemplary embodiment.

FIG. 2 is a side view of HAB 100 in an exemplary embodiment. For the view in FIG. 2, axis 180 from FIG. 1 is into the page. When hub 130 rotates in relation to core structure 140, gravity chambers 110-113 will be caused to spin about axis 180 (see also FIG. 1) like spokes on wheel. The rotation about axis 180 creates a centrifugal force 202 on objects (e.g., crew members) inside of gravity chambers 110-113. The centrifugal force 202 feels like gravity to crew members inside of gravity chambers 110-113.

Although four gravity chambers 110-113 are illustrated in FIGS. 1-2, HAB 100 may be equipped with more or less gravity chambers 110-113 as desired. To balance rotation of gravity chambers 110-113 about axis 180, it may be desirable to install the gravity chambers 110-113 in opposing pairs about the axis 180. An opposing pair of gravity chambers will extend radially from hub 130 in opposite directions. For example, gravity chambers 110 and 112 represent an opposing pair, as does gravity chambers 111 and 113. The opposing pairs of gravity chambers may have similar size and weight to assist in balancing rotation.

FIGS. 3-4 illustrate gravity chamber 110 in an exemplary embodiment. Gravity chamber 110 has an outer wall 310, an inner structure 311, and a cylindrical side wall 312 that extends between outer wall 310 and inner structure 311. Outer wall 310, which will serve as the floor of gravity chamber 110, and side wall 312 may be made from a thin metal, a composite material, a plastic, or another type of rigid material. The interior of outer wall 310 and side wall 312 may be lined with a rubber, padding, or any other material that protects crew members inside of gravity chamber 110. Inner structure 311, which will serve as the ceiling of gravity chamber 110, includes the framework and parts for connecting gravity chamber 110 to hub 130. Thus, inner structure 311 may include a passage tube 314 and a berthing connector 315. Passage tube 314 is hollow and provides a passage way for crew members to pass between gravity chamber 110 and an interior of hub 130. Passage tube 314 may include a ladder, steps, or some type of mechanism to assist crew members in traveling through passage tube 314.

As gravity chamber 110 rotates on hub 130 (see FIG. 2), the centrifugal force 202 created will pull a crew member towards outer wall 310 (i.e., floor) of gravity chamber 110. The amount of force on an object depends on the angular velocity of rotation and the distance of the object from the axis of rotation. Although the dimensions of gravity chamber 110 may vary as desired, a length (L) of gravity chamber 110 may be selected so that the distance of outer wall 310 to the axis 180 of rotation is in the range of 7-8 meters.

In this embodiment, gravity chamber 110 is cylindrical and may have a diameter that is about 4.3 meters or less. The diameter of gravity chamber 110 may be limited by the size of the launch vehicle used to transport the individual components of HAB 100 into space. For example, an Atlas rocket from NASA may be used to transport the individual components of HAB 100 into space, and the diameter of gravity chamber 110 may be constrained by the size of the Atlas rocket, which is typically about 4.3 meters. Although gravity chamber 110 has a cylindrical shape in FIGS. 3-4, the shape of gravity chamber 110 may have different shapes in other embodiments.

The interior of gravity chamber 110 may be hollow or empty to form open quarters for crew members. The interior of gravity chamber 110 may include a treadmill, an exercise bike, or any other exercise equipment. The interior of gravity chamber 110 may include restroom facilities (e.g., a shower, a toilet, a sink, etc.), office facilities (e.g., a desk, chairs, cabinets, etc.), lounge facilities (e.g., chairs, a couch, etc.), sleeping facilities (e.g., a bed), or any other facilities. Gravity chamber 110 may also be compartmentalized into multiple individual rooms.

Figure 5:
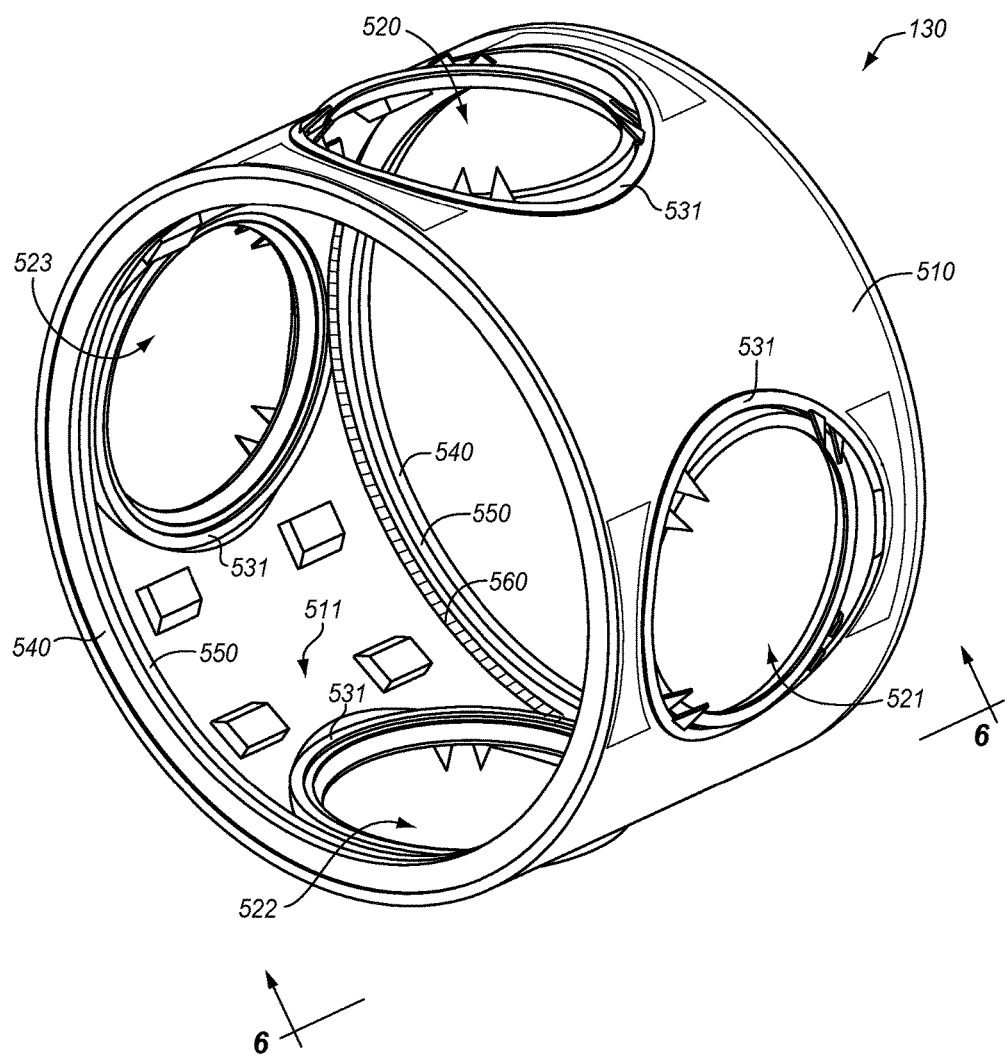
FIGS. 5-6 illustrate a hub in an exemplary embodiment.
Figure 6:
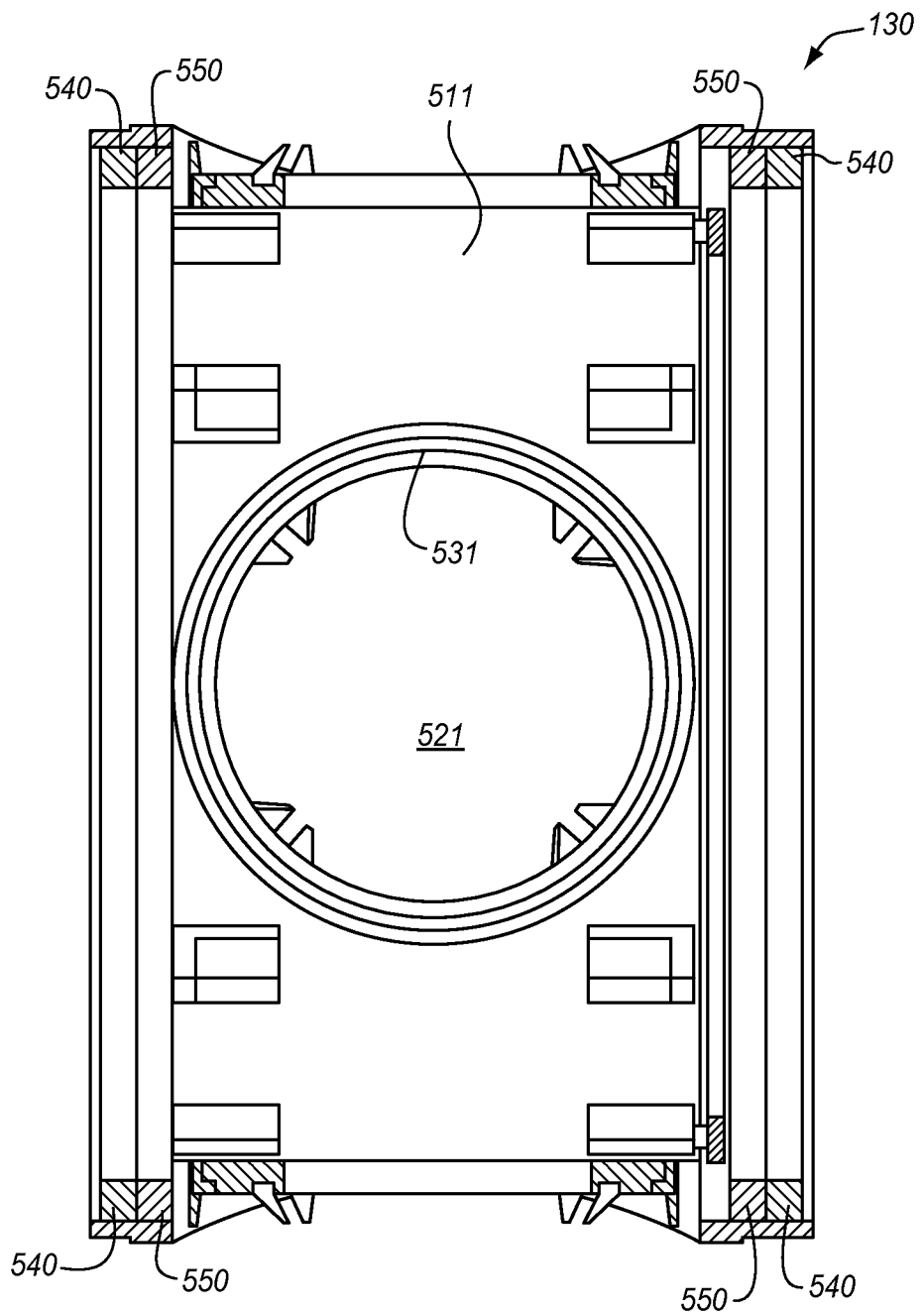

FIGS. 5-6 illustrate hub 130 in an exemplary embodiment. In the isometric view of FIG. 5, hub 130 is a hollow cylinder (i.e., annular or ring-shaped), and has an outer cylindrical surface 510 that defines the outer diameter of hub 130, and an inner cylindrical surface 511 that defines an inner diameter of hub 130. Hub 130 also includes a plurality of portals 520-523 that are spaced radially around the circumference of hub 130. Portals 520-523 are openings in hub 130 from outer cylindrical surface 510 to inner cylindrical surface 511 that provide passageways between the interior of hub 130 and the interiors of gravity chambers 110-113. Each portal 520-523 is able to connect with a gravity chamber 110-113 (see FIG. 1) through a berthing connector 531. Berthing connector 531 comprises any mechanism that forms an air-tight or pressure-tight seal between hub 130 and a gravity chamber 110-113. One example of berthing connector 531 is a Common Berthing Mechanism (CBM). A CBM includes an Active Common Berthing Mechanism (ACBM) and a Passive Common Berthing Mechanism (PCBM) that form a pressure-tight seal. In this embodiment, the berthing connector 531 of hub 130 may comprise an ACBM, and the berthing connector 315 of gravity chamber 110 (see FIG. 3) may comprise a PCBM.

Figure 7:
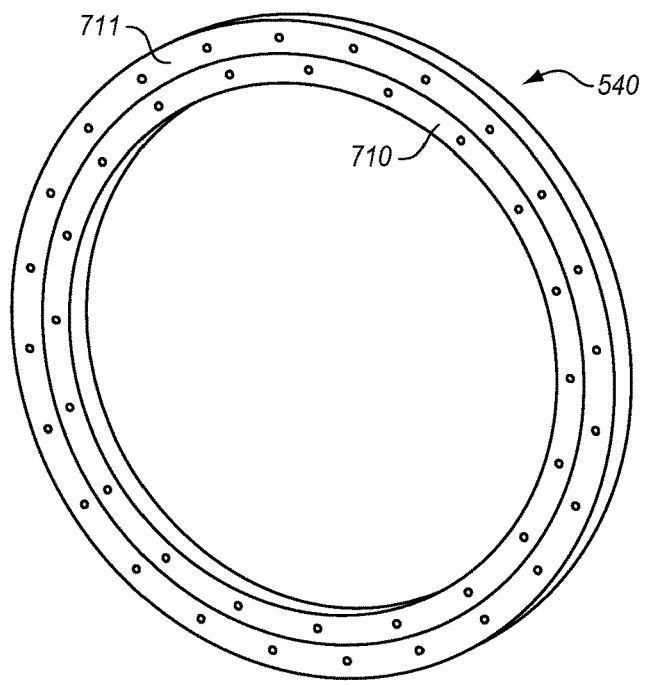
FIG. 7 illustrates a support bearing for a hub in an exemplary embodiment.

To allow hub 130 to rotate in relation to core structure 140 (see FIG. 1), hub 130 may attach to core structure 140 with rotatable attachment members, such as support bearings 540. FIG. 6 is a cross-sectional view of hub 130 further illustrating support bearings 540. FIG. 6 is a cross-section along line 6-6 of FIG. 5. Support bearings 540 are ring-shaped and attach to opposing sides of hub 130. FIG. 7 illustrates a support bearing 540 for hub 130 in an exemplary embodiment. Support bearing 540 includes an inner race (or ring) 710, an outer race (or ring) 711, and a rolling element between inner race 710 and outer race 711 that enables rotational movement (not visible in FIG. 7). The rolling element may comprise ball bearings, cylindrical rollers, or the like. Outer race 711 is configured to attach to hub 130 (i.e., inner cylindrical surface 511), while inner race 710 is configured to attach to core structure 140.

Figure 8:
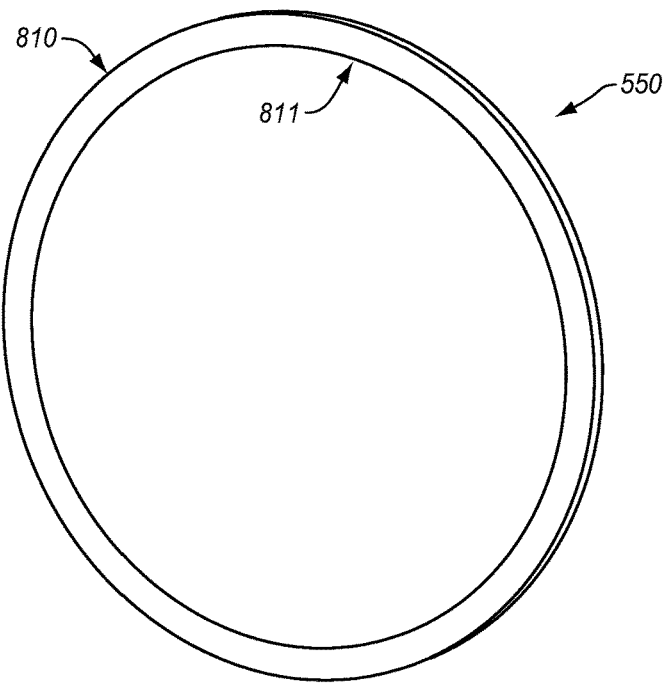
FIG. 8 illustrates a rotary seal in an exemplary embodiment.

Although hub 130 is able to rotate in relation to core structure 140, the attachment point or juncture between hub 130 and core structure 140 is sealed so that the interior of hub 130 and gravity chambers 110-113 may be pressurized (e.g., to 1 atmosphere). Any gap or seam between hub 130 and gravity chambers 110-113 at their attachment point is sealed with rotary seals 550. FIG. 8 illustrates rotary seal 550 in an exemplary embodiment. In this embodiment, rotary seal 550 is configured to attach to hub 130 by its outer surface 810. For example, the inner cylindrical surface 511 of hub 130 may include a recess that receives the outer surface 810 of rotary seal 550. Rotary seal 550 also includes an inner surface 811 that is configured to contact a surface of core structure 140 to form an air-tight or pressure-tight seal. A cross-section of rotary seal 550 may have any desired shape, such as rectangular, round, ribbed, etc.

Figure 9:
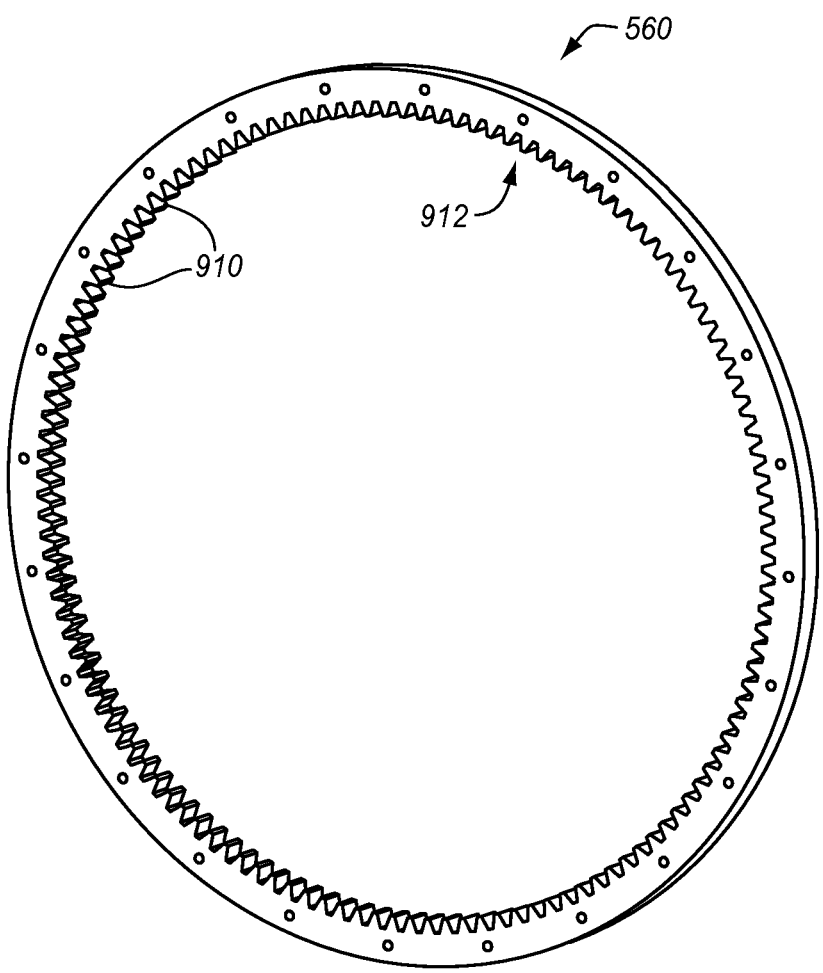
FIG. 9 illustrates a ring gear in an exemplary embodiment.

Hub 130 also includes a ring gear 560 that attaches to the inner cylindrical surface 511 of hub 130 (see FIG. 6) to mate with a drive mechanism. FIG. 9 illustrates ring gear 560 in an exemplary embodiment. In this embodiment, ring gear 560 includes a plurality of teeth 910 on an inner surface 912 for meshing with a drive gear of a drive mechanism of HAB 100. Although one ring gear 560 is illustrated in FIGS. 5-6, a ring gear 560 may be affixed to each side of hub 130 to drive hub 130 from both sides.

Figure 10:
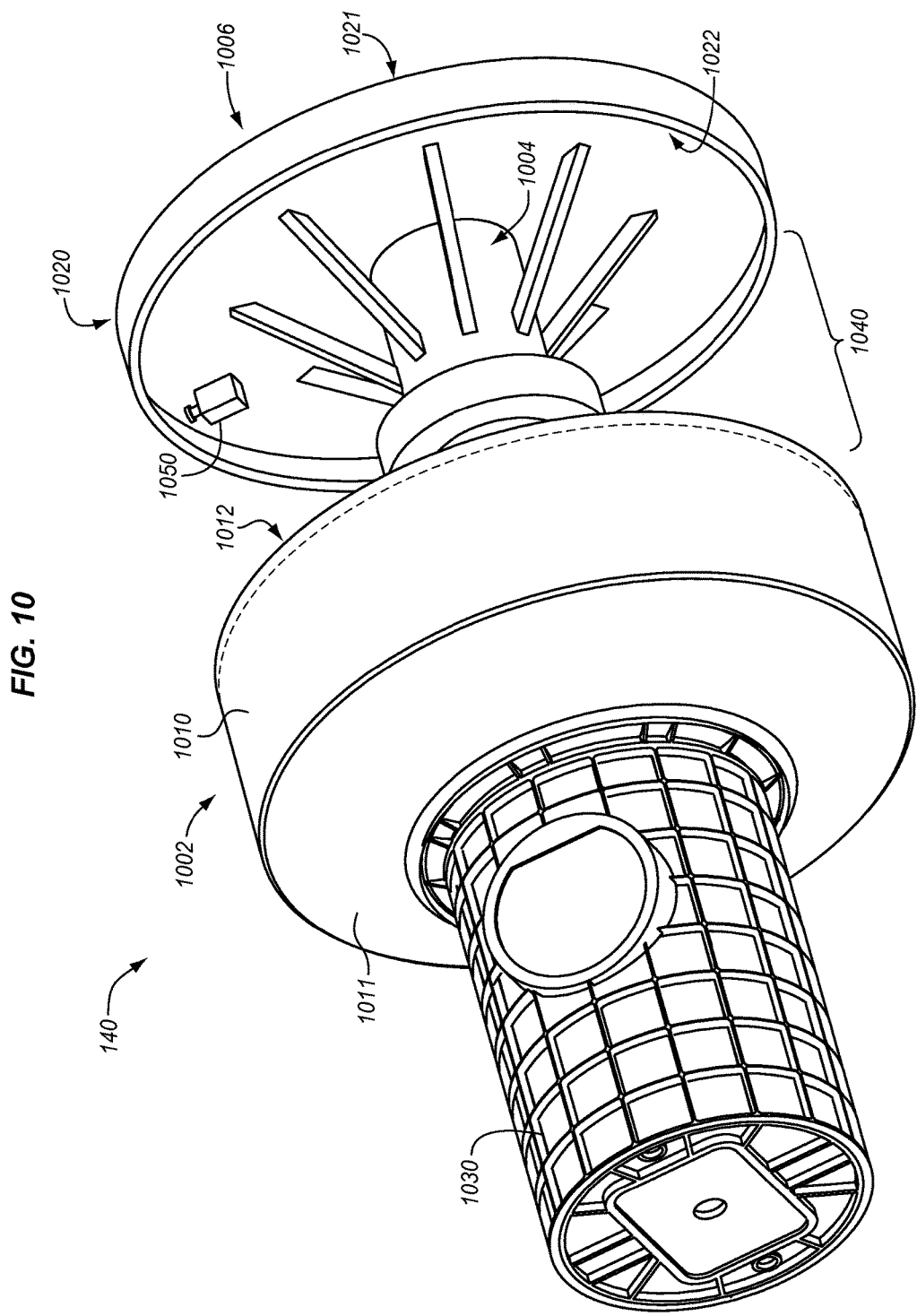
FIGS. 10-11 illustrate a core structure in an exemplary embodiment.
Figure 11:
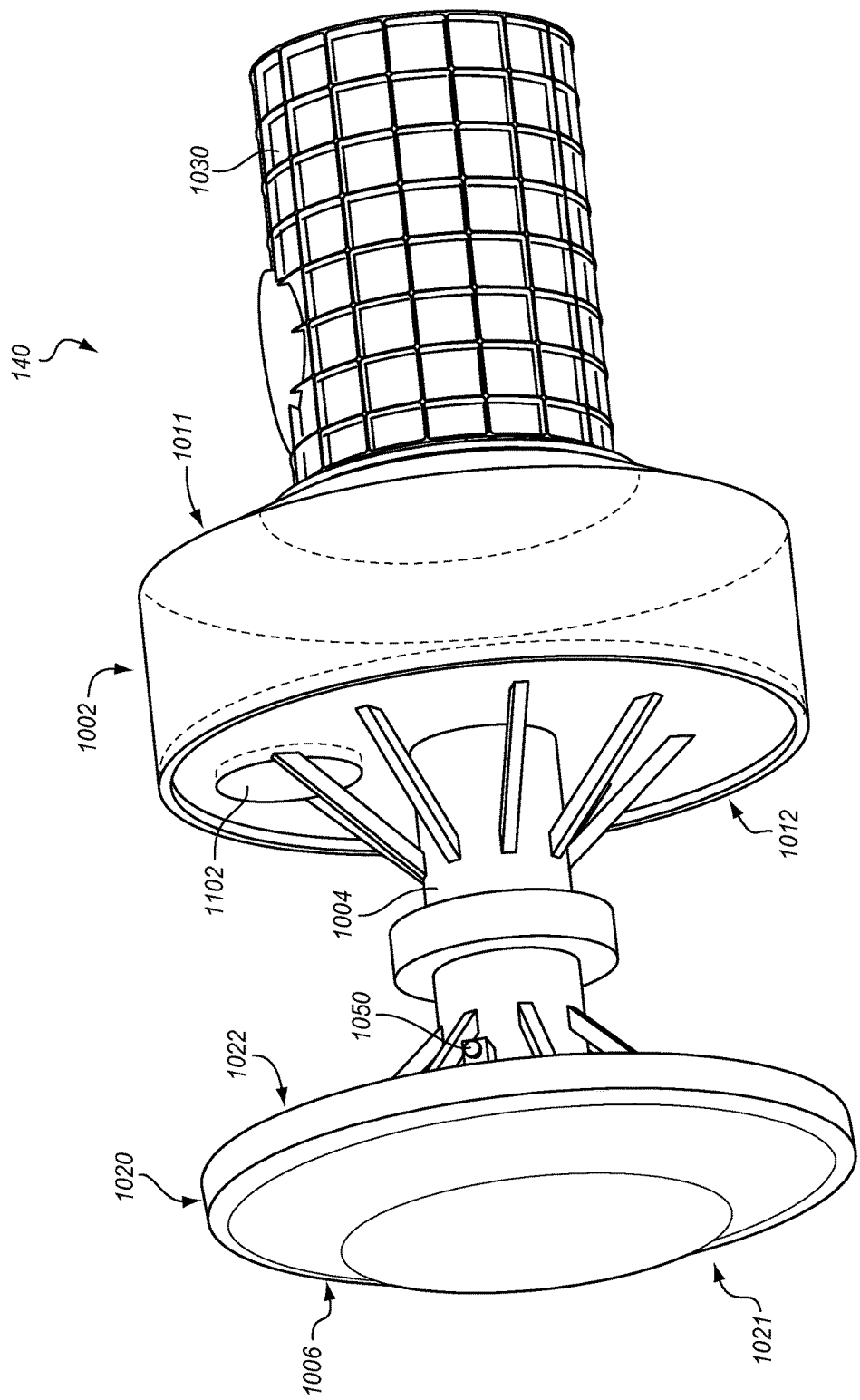

FIGS. 10-11 illustrate core structure 140 in an exemplary embodiment. Core structure 140 includes a pressurized section 1002, a support beam 1004, and an end section 1006 (see FIG. 10). Pressurized section 1002 is a cylindrical section or chamber of core structure 140 that is pressurized and supplied with oxygen for use by crew members. Pressurized section 1002 includes an outer cylindrical wall 1010 and opposing side walls 1011-1012. Side wall 1011 connects to a connecting chamber 1030, which allows crew members to pass from other modules of a space station to pressurized section 1002. Side wall 1012 connects to support beam 1004. Support beam 1004 is a member that provides a support structure between pressurized section 1002 and end section 1006. End section 1006 is a cylindrical section or chamber of core structure 140 that is spaced apart and aligned co-axially with pressurized section 1002. End section 1006 may be an end cap of HAB 100, or may also comprise a pressurized chamber. End section 1006 includes an outer cylindrical wall 1020 and opposing side walls 1021-1022. When assembled, hub 130 will cover the free space 1040 or open area between pressurized section 1002 and end section 1006 within the interior of hub 130.

Pressurized section 1002 and/or end section 1006 have an outer diameter that fits within an inner diameter of hub 130 so that hub 130 is able to slide over pressurized section 1002 or end section 1006 during assembly. When assembled, one side of hub 130 attaches to outer cylindrical wall 1010 of pressurized section 1002 via a rotatable attachment member, such as support bearing 540 (see FIG. 7). The other side of hub 130 attaches to outer cylindrical wall 1020 of end section 1006 via a rotatable attachment member, such as support bearing 540. The outer diameters of pressurized section 1002 and/or end section 1006 may be the same in one embodiment.

Side wall 1012 of pressurized section 1002 includes a hatch 1102 (see FIG. 11) for crew members to pass between pressurized section 1002 and an interior of hub 130.

A drive mechanism 1050 (see FIG. 10) is attached to end section 1006 in this embodiment. Drive mechanism 1050 is placed proximate or adjacent to ring gear 560 of hub 130 (see FIG. 6). Drive mechanism 1050 is configured to spin a drive gear to impart rotational movement to ring gear 560. Teeth on the drive gear of drive mechanism 1050 mesh with teeth 910 of ring gear 560 (see FIG. 9). When drive mechanism 1050 turns its drive gear, it imparts rotational movement on hub 130 about axis 180 (see FIG. 1). Drive mechanism 1050 may comprise an electric motor, a hydraulic motor, a pneumatic motor, or any other actuating device that has a variable rotational speed.

Figure 12:
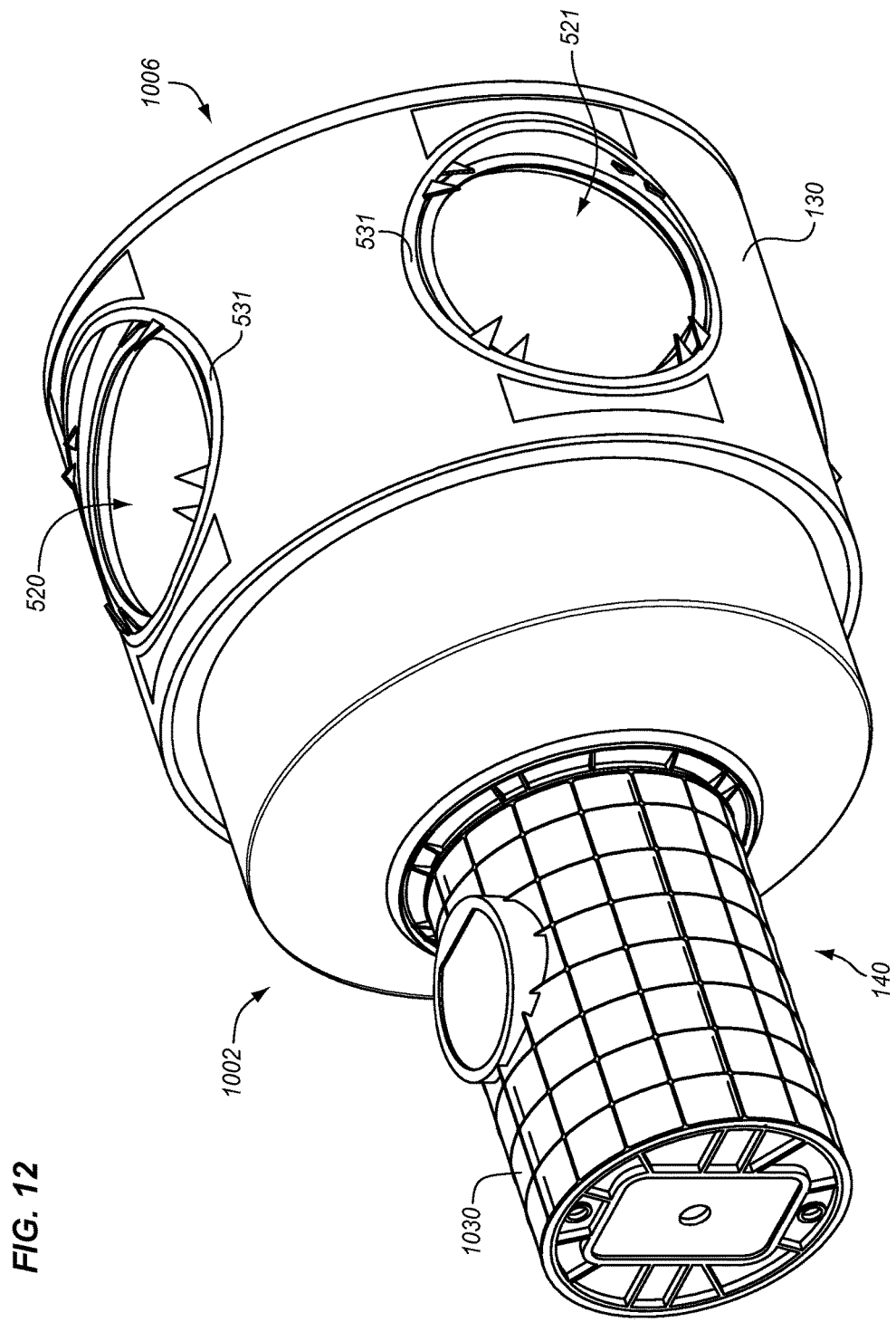
FIGS. 12-14 illustrate a hub installed on a core structure in an exemplary embodiment.
Figure 13:
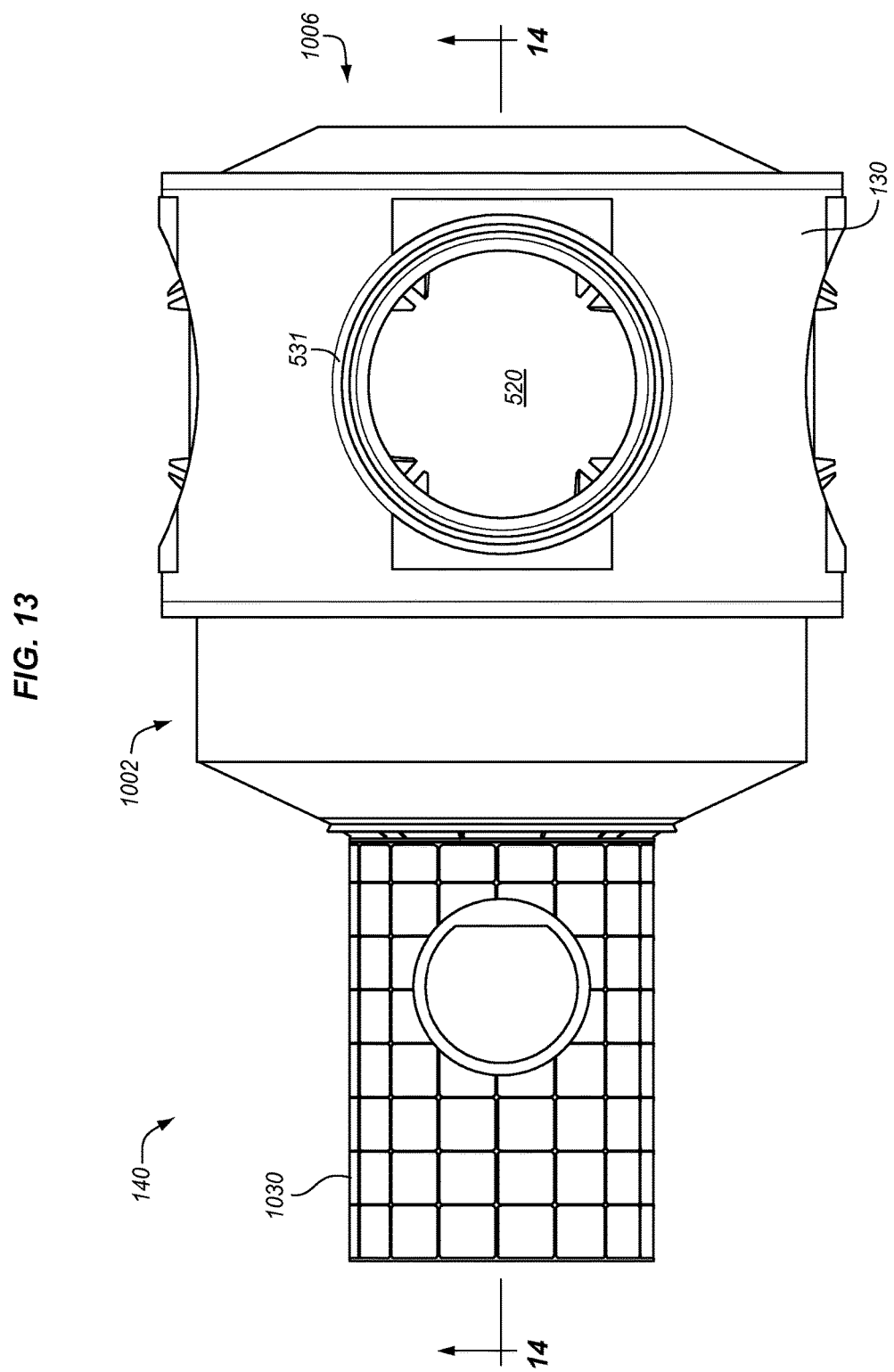
Figure 14:
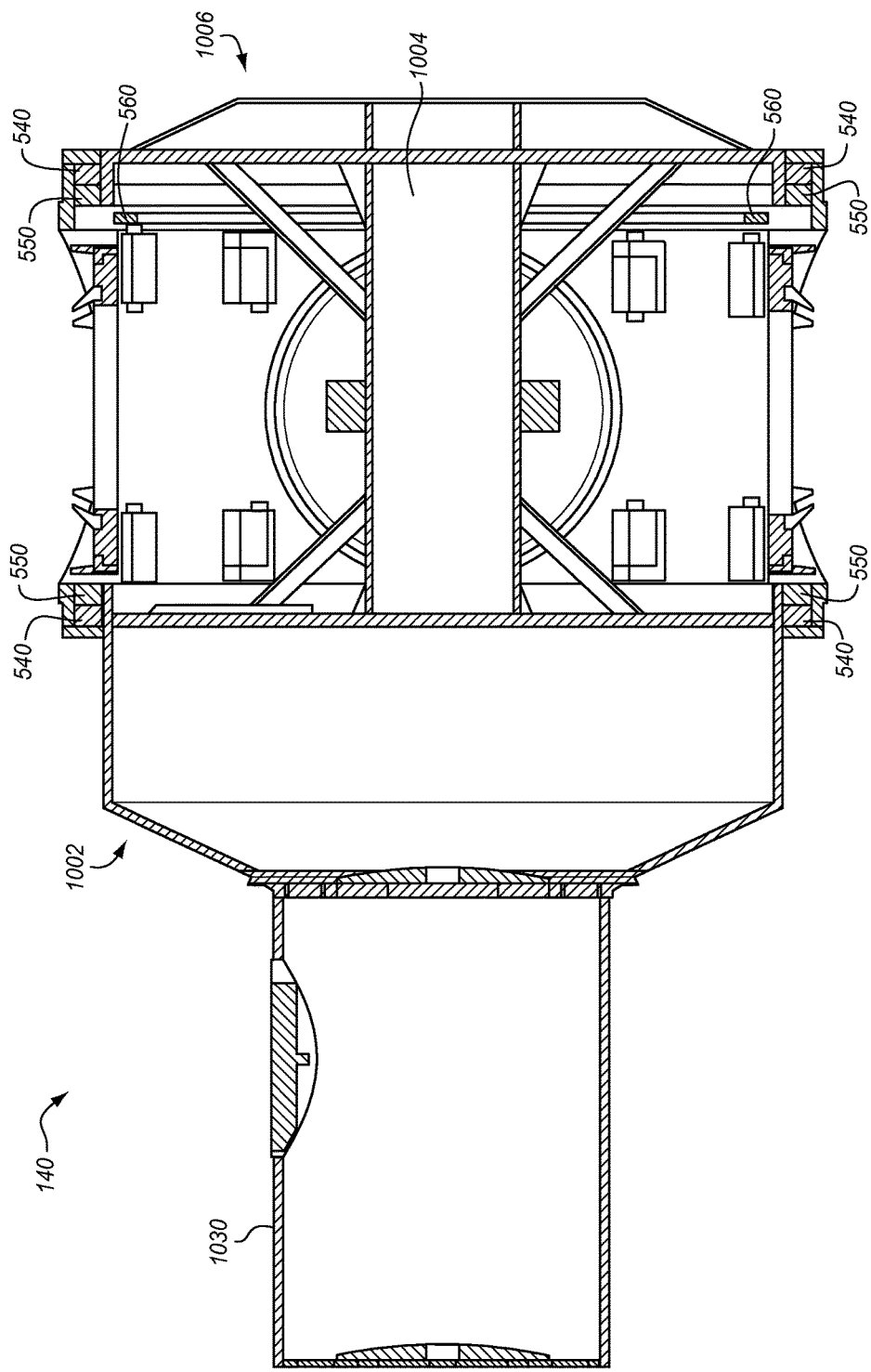

FIGS. 12-14 illustrate hub 130 installed on core structure 140 in an exemplary embodiment. In FIGS. 12-13, hub 130 slides axially over pressurized section 1002 and onto core structure 140 to span a distance between pressurized section 1002 and end section 1006. One side of hub 130 is proximate to pressurized section 1002 and the other side is proximate to end section 1006 so that hub 130 is over (or covers) free space 1040 between pressurized section 1002 and end section 1006. FIG. 14 is a cross-section along line 14-14 of FIG. 13. Hub 130 attaches to pressurized section 1002 with a first support bearing 540, and attaches to end section 1006 with a second support bearing 540. Because the attachment point is provided through bearings 540, hub 130 is able to rotate in relation to pressurized section 1002 and end second 1006. Rotary seals 550 are installed on either side of hub 130 between the support bearings 540 and an interior of hub 130. For example, near the attachment point of hub 130 to pressurized section 1002, a first rotary seal 550 is installed between the first support bearing 540 and the interior of hub 130. The first rotary seal 550 spans a gap between hub 130 and pressurized section 1002 to create an air-tight or pressure-tight seal around a circumference of pressurized section 1002. Near the attachment point of hub 130 to end section 1006, a second rotary seal 550 is installed between the second support bearing 540 and the interior of hub 130. The second rotary seal 550 spans a gap between hub 130 and end section 1006 to create an air-tight or pressure-tight seal around a circumference of the end section 1006.

Figure 15:
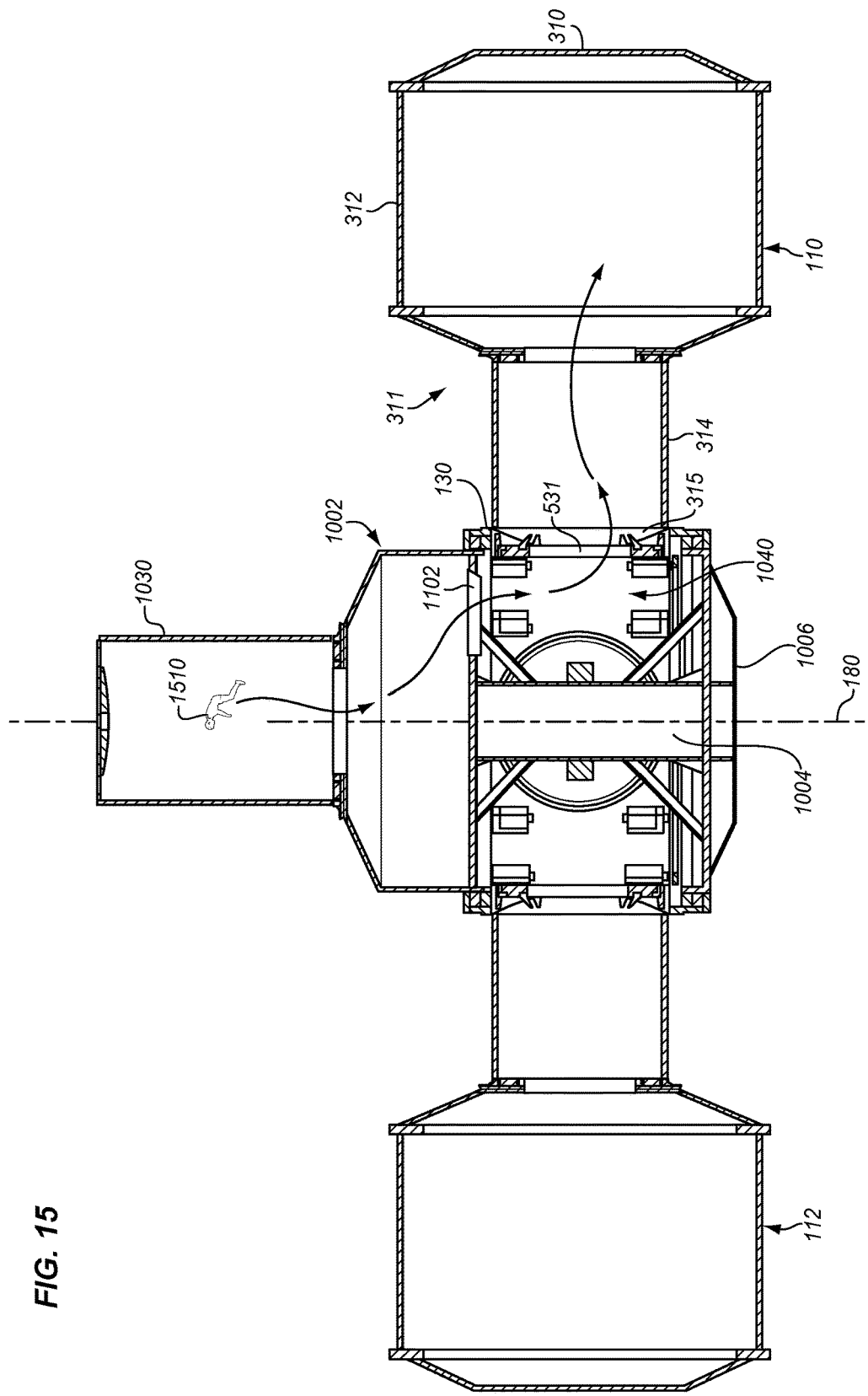
FIGS. 15-16 illustrate an interior of a habitation module in an exemplary embodiment.
Figure 16:
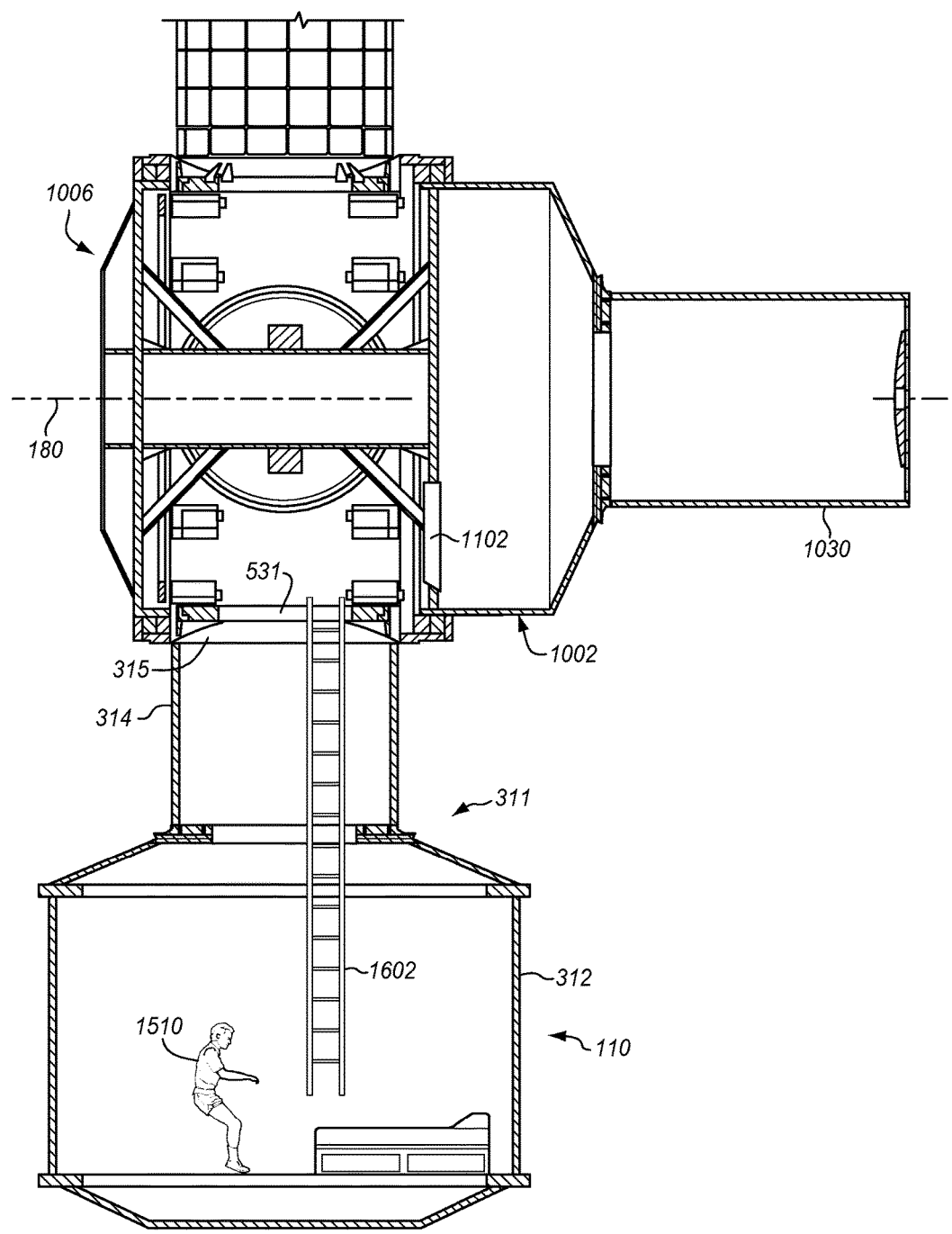

With hub 130 attached to core structure 140 as in FIGS. 12-14, gravity chambers 110-113 may be affixed to portals 520-523 (see FIG. 5). The result of attaching gravity chambers 110-113 is illustrated in FIG. 1, where pairs of gravity chambers 110-113 extend radially from hub 130. Drive mechanism 1050 (see FIG. 10) is able to impart rotational movement to hub 130. Due to the rotation of hub 130 (see FIG. 2), a force will be created within each gravity chamber 110-113 that creates an artificial gravity environment. Crew members may access any of gravity chambers 110-113 to experience the artificial gravity environment. FIGS. 15-16 illustrate an interior of HAB 100 in an exemplary embodiment. Assume, for example, that a crew member 1510 is initially within pressurized section 1002. Crew member 1510 may pass through hatch 1102 of pressurized section 1002 (see FIG. 11), and enter the free space 1040 within the interior of hub 130. Crew member 1510 may then pass from the free space 1040 within the interior of hub 130, through a portal (e.g., portal 520 of FIG. 5) of hub 130, and into gravity chamber 110 (see FIG. 16). The passage tube 314 of gravity chamber 110 may include a ladder 1602 or another mechanism to assist crew member 1510 in entering gravity chamber 110.

When inside of gravity chamber 110, crew member 1510 will experience the artificial gravity environment created by rotation of gravity chamber 110/hub 130 about axis 180. The force created by rotation of gravity chamber 110 about axis 180 pushes crew member 1510 against end wall 310, which feels like gravity. That way, crew member 1510 may sleep, exercise, etc., within gravity chamber 110 in an artificial gravity environment, which has health benefits such as reduced muscle and bone degeneration.

Also, the interiors of hub 130 and gravity chambers 110-113 are pressurized and temperature-controlled so that crew member 1510 does not need to wear a specialize suit. Even though hub 130 rotates in relation to core structure 140, the attachment points between hub 130 and core structure 140 are sealed so that an oxygen-supplied and thermally-controlled environment is created within the interiors of hub 130 and gravity chambers 110-113. Hatches are not needed between hub 130 and gravity chambers 110-113 because they are maintained at the same pressure. Thus, crew member 1510 can quickly and easily travel between gravity chambers 110-113, even while hub 130 continues to rotate. The pressurized and thermally-controlled environment is also advantageous within the interior of hub 130, as drive unit 1050 is readily accessible for replacement or repair, and bearings 540 and seals 550 are accessible for service.

The rotation of gravity chambers 110-113 on hub 130 may create an unwanted momentum for HAB 100. To cancel out the unwanted momentum, a counter-rotating member may be installed to rotate about axis 180 in an opposite direction than hub 130. FIG. 17 illustrates a counter-rotating member 1702 in an exemplary embodiment. In this embodiment, counter-rotating member 1702 is installed on core structure 140 within the interior of hub 130. Counter-rotating member 1702 attaches to support beam 1004, such as with support bearings, and includes a mass that is able to be rotated around support beam 1004. In the embodiment shown in FIG. 17, counter-rotating member 1702 includes a counter-weight 1704 that is an annular ring having a diameter greater than the diameter of support beam 1004. Counter-weight 1704 does not have to be a continuous structure as shown in FIG. 17, but may be segmented and spaced around the circumference of support beam 1004. Counter-weight 1704 is driven by a drive mechanism 1706 to rotate in the opposite direction of hub 130 about axis 180 to negate momentum created by rotation of hub 130. Momentum is measured in mass multiplied by velocity (rotational). If it is assumed that the mass of counter-weight 1704 is fixed, then counter-weight 1704 is driven at a speed to compensate for the momentum created by rotation of hub 130. If the mass of hub 130 changes (e.g., crew members enter one of gravity chambers 110-113), then drive mechanism 1706 adjusts the rotational speed of counter-weight 1704 to compensate for the change in mass. The rotational speed of counter-weight 1704 is therefore adjusted so that there is a net-zero momentum change due to rotation of hub 130. A protective cover 1710 may be installed to enclose counter-rotating member 1702, and to shield crew members from moving parts of counter-rotating member 1702.

Although specific embodiments were described herein, the scope is not limited to those specific embodiments. Rather, the scope is defined by the following claims and any equivalents thereof.

The invention claimed is:

1. A habitation module comprising:
a core structure that includes:
a first cylindrical section;
a second cylindrical section spaced apart from the first cylindrical section and aligned axially; and
a support beam that attaches the first cylindrical section and the second cylindrical section;
a hub comprising a hollow cylinder that slides onto the core structure over free space between the first cylindrical section and the second cylindrical section, and connects to the first cylindrical section and the second cylindrical section through rotatable attachment members, wherein the hub includes a plurality of portals spaced radially around a circumference of the hub;
a first rotary seal that spans a first gap between the hub and the first cylindrical section to form an air-tight seal around a circumference of the first cylindrical section;
a second rotary seal that spans a second gap between the hub and the second cylindrical section to form an air-tight seal around a circumference of the second cylindrical section;
a plurality of gravity chambers that attach to the portals of the hub through air-tight seals;
wherein the air-tight seals provide a pressurized environment within the free space and within the gravity chambers; and
a first drive mechanism that rotates the hub about an axis in relation to the core structure to simulate a gravitational force within the gravity chambers.

2. The habitation module of claim 1 wherein:
the first cylindrical section comprises a pressurized compartment that includes a hatch for accessing the free space.

3. The habitation module of claim 2 wherein:
the portals provide passageways between the free space and interiors of the gravity chambers.

4. The habitation module of claim 3 wherein:
each gravity chamber includes an outer wall, an inner structure, and a cylindrical side wall that connects the outer wall and the inner structure; and
the inner structure of each gravity chamber includes a berthing connector for connecting a gravity chamber to a berthing connector of a portal of the hub.

5. The habitation module of claim 4 wherein:
the berthing connectors comprise a Common Berthing Mechanism (CBM).

6. The habitation module of claim 4 wherein:
a length of each of the gravity chambers is selected so that a distance of the outer wall to the axis of rotation is in the range of 7-8 meters.

7. The habitation module of claim 1 wherein:
the gravity chambers extend radially from the circumference of the hub.

8. The habitation module of claim 1 wherein:
the hub connects to the core structure with a pair of support bearings attached to opposing sides of the hub;
a first one of the support bearings connects the hub to the first cylindrical section; and
a second one of the support bearings connects the hub to the second cylindrical section.

9. The habitation module of claim 8 wherein:
the first one of the support bearings includes:
a first outer race attached to an inner surface of the hub;
a first inner race attached to an outer surface of the first cylindrical section; and
a rolling element between the first inner race and the first outer race that enables rotational movement; and
the second one of the support bearings includes:
a second outer race attached to the inner surface of the hub;
a second inner race attached to an outer surface of the second cylindrical section; and
a rolling element between the second inner race and the second outer race that enables rotational movement.

10. The habitation module of claim 1 further comprising:
a counter-rotating member that rotates about the axis in an opposite direction than the hub.

11. The habitation module of claim 10 wherein the counter-rotating member comprises:
a cylindrical counter-weight; and
a second drive mechanism that rotates the cylindrical counter-weight about the axis in the opposite direction than the hub.

12. The habitation module of claim 11 wherein:
the second drive mechanism adjusts a rotational speed of the cylindrical counter-weight to compensate for a change in mass within the gravity chambers.

13. The habitation module of claim 10 further comprising:
a protective cover that encloses the counter-rotating member.

14. The habitation module of claim 1 further comprising:
a ring gear affixed to the hub and having teeth that mesh with teeth on the first drive mechanism.

15. A habitation module comprising:
a stationary structure;
a rotating structure that attaches to an outer circumference of the stationary structure using rotatable attachment members, the rotating structure comprising:
a hub that comprises a hollow cylinder having a plurality of portals spaced radially around a circumference of the hub; and
a plurality of gravity chambers that attach to the portals of the hub, and extend radially from the hub; and
a first drive mechanism that rotates the hub about an axis in relation to the stationary structure to simulate a gravitational force within the gravity chambers.

16. The habitation module of claim 15 further comprising:
rotary seals that form an air-tight seal between the rotating structure and the stationary structure.

17. The habitation module of claim 16 wherein:
the stationary structure includes:
a first cylindrical section;
a second cylindrical section spaced apart from the first cylindrical section and aligned axially; and
a support beam that attaches the first cylindrical section and the second cylindrical section.

18. The habitation module of claim 17 wherein the rotary seals comprise:
a first rotary seal that spans a first gap between the hub and the first cylindrical section to form an air-tight seal around a circumference of the first cylindrical section; and
a second rotary seal that spans a second gap between the hub and the second cylindrical section to form an air-tight seal around a circumference of the second cylindrical section.

19. The habitation module of claim 18 wherein:
the hub attaches to the stationary structure with a pair of support bearings attached to opposing sides of the hub;
a first one of the support bearings connects the hub to the first cylindrical section; and
a second one of the support bearings connects the hub to the second cylindrical section.

20. The habitation module of claim 15 wherein:
the portals provide passageways between an interior of the hub and interiors of the gravity chambers.

21. The habitation module of claim 15 wherein:
each gravity chamber includes an outer wall, an inner structure, and a cylindrical side wall that connects the outer wall and the inner structure; and
the inner structure of each gravity chamber includes a berthing connector for connecting a gravity chamber to a berthing connector of a portal of the hub.

22. The habitation module of claim 21 wherein:
the berthing connectors comprise a Common Berthing Mechanism (CBM).

23. The habitation module of claim 15 further comprising:
a counter-rotating member that rotates about the axis in an opposite direction than the hub.

24. The habitation module of claim 23 wherein the counter-rotating member comprises:
a cylindrical counter-weight; and
a second drive mechanism that rotates the cylindrical counter-weight about the axis in the opposite direction than the hub.

25. The habitation module of claim 24 wherein:
the second drive mechanism adjusts a rotational speed of the cylindrical counter-weight to compensate for a change in mass within the gravity chambers.

26. The habitation module of claim 23 further comprising:
a protective cover that encloses the counter-rotating member.

27. An apparatus comprising:
a habitation module for providing an artificial gravity environment in space, the habitation module comprising:
a core structure having coaxial cylindrical sections spaced apart from one another;
a hub that comprises a hollow cylinder that slides over one of the cylindrical sections of the core structure to span a distance between the cylindrical sections, wherein the hub includes a plurality of portals spaced radially around a circumference of the hub;
at least one pair of gravity chambers that attach to opposing portals of the hub, and extend radially from the hub;
rotary seals that form an air-tight seal between the hub and the cylindrical sections of the core structure; and
a drive mechanism that rotates the hub about an axis in relation to the core structure to simulate a gravitational force within the gravity chambers.

28. The apparatus of claim 27 wherein the rotary seals comprise:
a first rotary seal that spans a first gap between the hub and a first cylindrical section of the core structure to form an air-tight seal around a circumference of the first cylindrical section; and
a second rotary seal that spans a second gap between the hub and a second cylindrical section of the core structure to form an air-tight seal around a circumference of the second cylindrical section.

29. The apparatus of claim 27 wherein:
each gravity chamber includes an outer wall, an inner structure, and a cylindrical side wall that connects the outer wall and the inner structure; and
the inner structure of each gravity chamber includes a berthing connector for connecting a gravity chamber to a berthing connector of a portal of the hub.

30. The apparatus of claim 29 wherein:
the berthing connectors comprise a Common Berthing Mechanism (CBM).

31. The apparatus of claim 27 wherein:
the hub connects to the core structure with a pair of support bearings attached to opposing sides of the hub;
a first one of the support bearings connects the hub to a first cylindrical section of the core structure; and
a second one of the support bearings connects the hub to a second cylindrical section of the core structure.

32. The apparatus of claim 27 further comprising:
a counter-rotating member that rotates about the axis in an opposite direction than the hub.

* * * * *